United States Patent
Shin et al.

(10) Patent No.: US 10,742,788 B2
(45) Date of Patent: Aug. 11, 2020

(54) MOBILE TERMINAL

(71) Applicant: LG ELECTRONICS INC., Seoul (KR)

(72) Inventors: Choonghwan Shin, Seoul (KR); Sunghwan Kim, Seoul (KR); Ara Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/335,648

(22) PCT Filed: Sep. 21, 2016

(86) PCT No.: PCT/KR2016/010544
§ 371 (c)(1),
(2) Date: Mar. 21, 2019

(87) PCT Pub. No.: WO2018/056476
PCT Pub. Date: Mar. 29, 2018

(65) Prior Publication Data
US 2020/0028948 A1    Jan. 23, 2020

(51) Int. Cl.
*G06F 1/16* (2006.01)
*H04M 1/02* (2006.01)

(52) U.S. Cl.
CPC ...... *H04M 1/0268* (2013.01); *H04M 2250/22* (2013.01)

(58) Field of Classification Search
CPC ... H04M 1/0268; G06F 1/1626; G06F 1/1652
(Continued)

(56) References Cited

U.S. PATENT DOCUMENTS

2009/0257189 A1*  10/2009  Wang ............... H04M 1/0249
                                                    361/679.56
2013/0002572 A1*   1/2013  Jin ..................... G06F 1/1637
                                                    345/173
(Continued)

FOREIGN PATENT DOCUMENTS

JP       2010134139        6/2010
JP       2011205496       10/2011
(Continued)

OTHER PUBLICATIONS

PCT International Application No. PCT/KR2016/010544, International Search Report dated Jun. 19, 2017, 2 pages.
(Continued)

*Primary Examiner* — Anthony Q Edwards
(74) *Attorney, Agent, or Firm* — Lee, Hong, Degerman, Kang & Waimey

(57) ABSTRACT

A mobile terminal is disclosed. The mobile terminal includes a housing having an internal space that is opened toward a front, and a display unit coupled to the housing and positioned in front of the internal space. The display unit includes a cover glass, a glass support adjacent to a side of the cover glass and disposed on a rear surface of the cover glass, wherein at least a portion of the glass support is positioned in the internal space and fixed to the cover glass, a frame including a frame body positioned in a rear of the cover glass, a first frame extension bent from the frame body to a rear of the frame body, and a second frame extension bent from the first frame extension, positioned between the first frame extension and the glass support, and coupled to the glass support, and a flexible display placed on the frame and disposed between the frame and the cover glass, wherein an edge area of the flexible display adjacent to the second
(Continued)

frame extension is disposed between the glass support and the first frame extension.

15 Claims, 15 Drawing Sheets

(58) Field of Classification Search
USPC .................................... 361/679.55, 679.56
See application file for complete search history.

(56) References Cited

U.S. PATENT DOCUMENTS

| | | | | |
|---|---|---|---|---|
| 2013/0140965 | A1* | 6/2013 | Franklin | G06F 1/1626 312/223.1 |
| 2015/0130767 | A1* | 5/2015 | Myers | G06F 3/0412 345/174 |
| 2015/0331444 | A1* | 11/2015 | Rappoport | G06F 1/1601 362/249.02 |
| 2016/0172623 | A1* | 6/2016 | Lee | B32B 3/04 257/40 |
| 2017/0288006 | A1* | 10/2017 | Yang | G09F 9/33 |
| 2018/0275719 | A1* | 9/2018 | Kwak | G06F 1/1643 |

FOREIGN PATENT DOCUMENTS

| | | |
|---|---|---|
| JP | 2012049671 | 3/2012 |
| KR | 20130083237 | 7/2013 |
| KR | 20130091588 | 8/2013 |
| KR | 1020160097105 | 8/2016 |

OTHER PUBLICATIONS

Korean Intellectual Property Office Application No. 10-2019-7005647, Notice of Allowance dated Jan. 13, 2020, 2 pages.

* cited by examiner

【Figure 1】
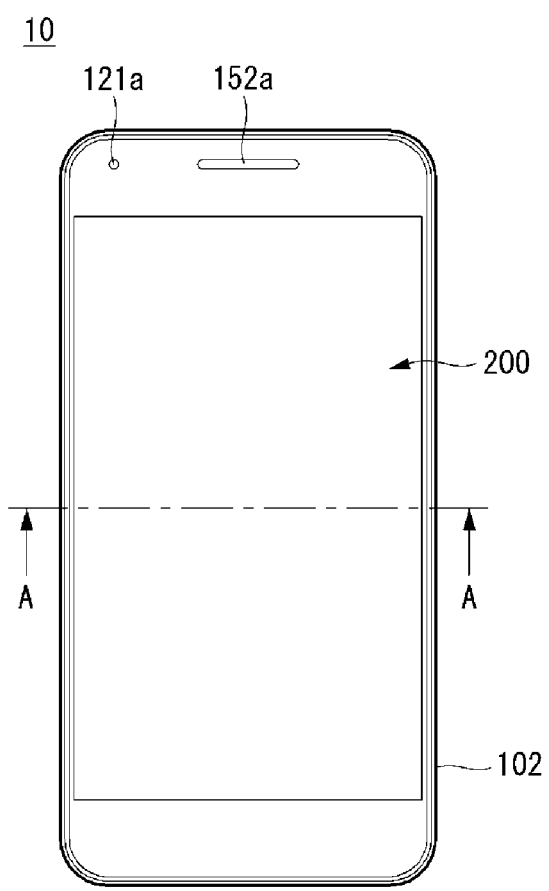

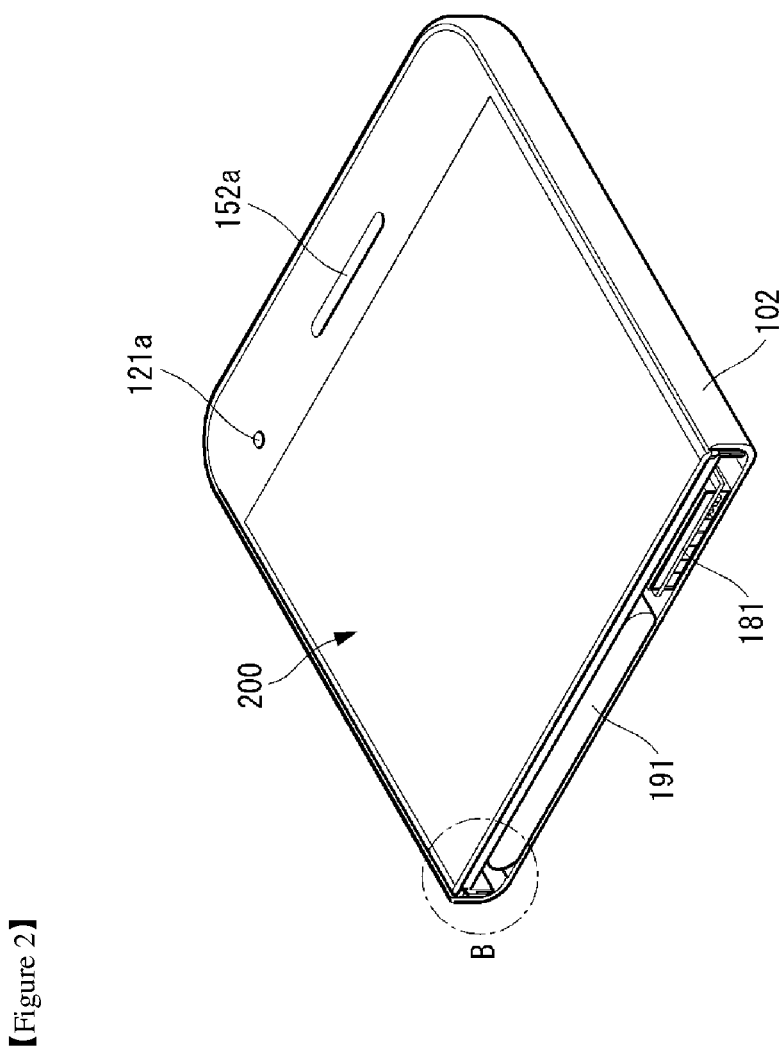
[Figure 2]

[Figure 3]
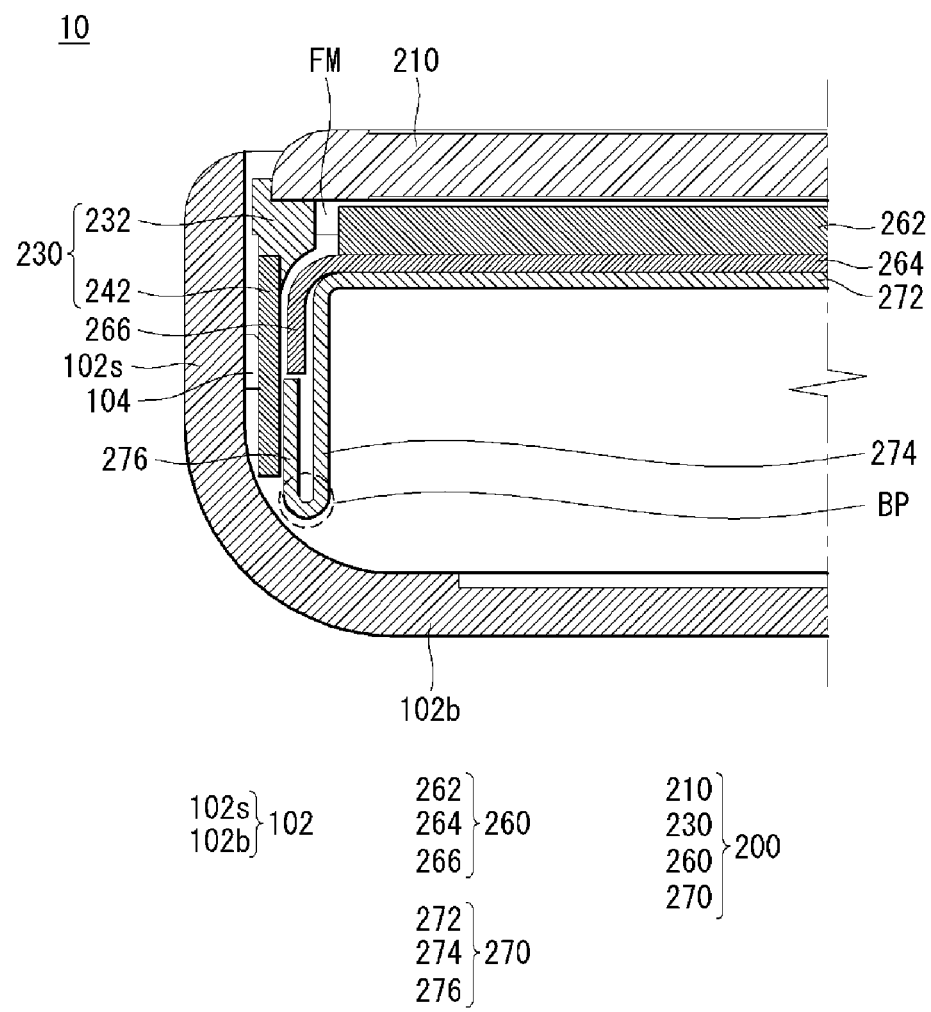

[Figure 4]
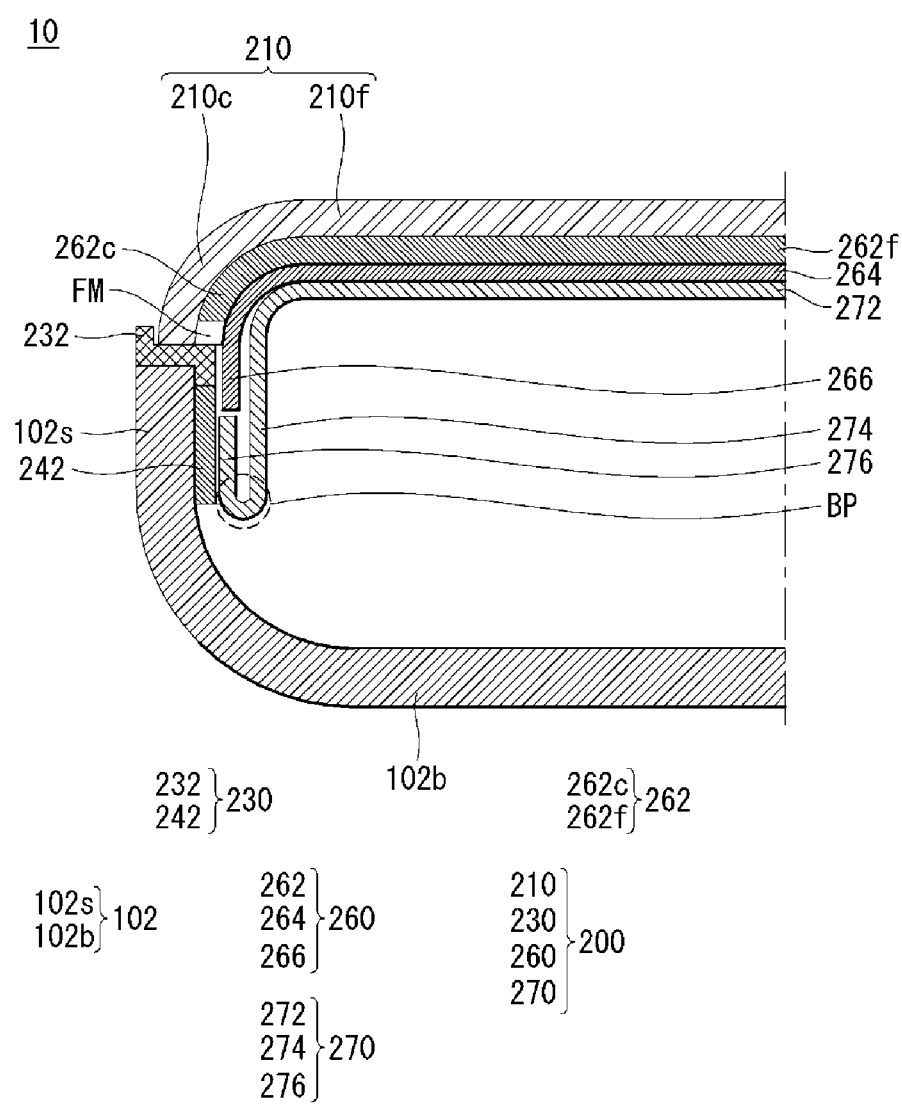

【Figure 5】
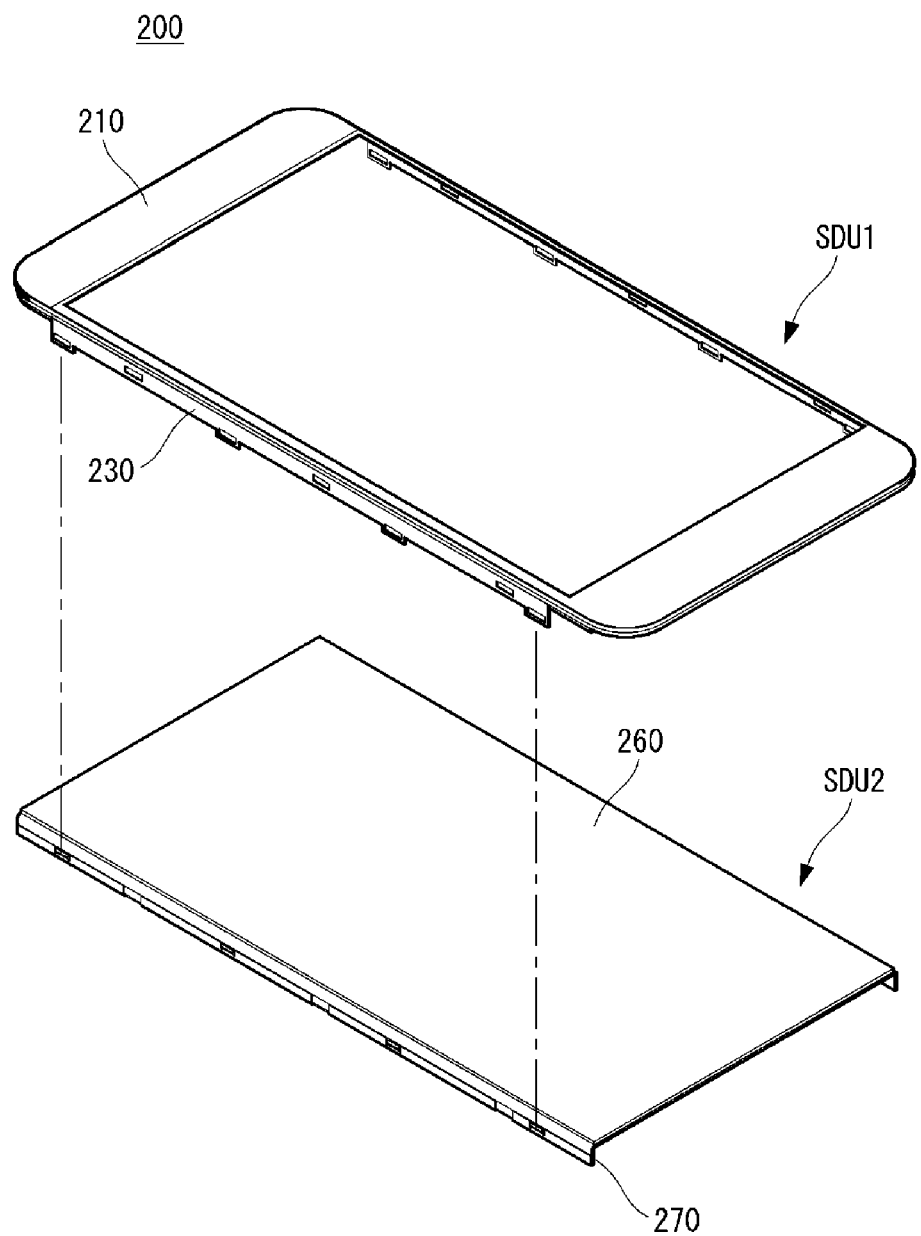

[Figure 6]
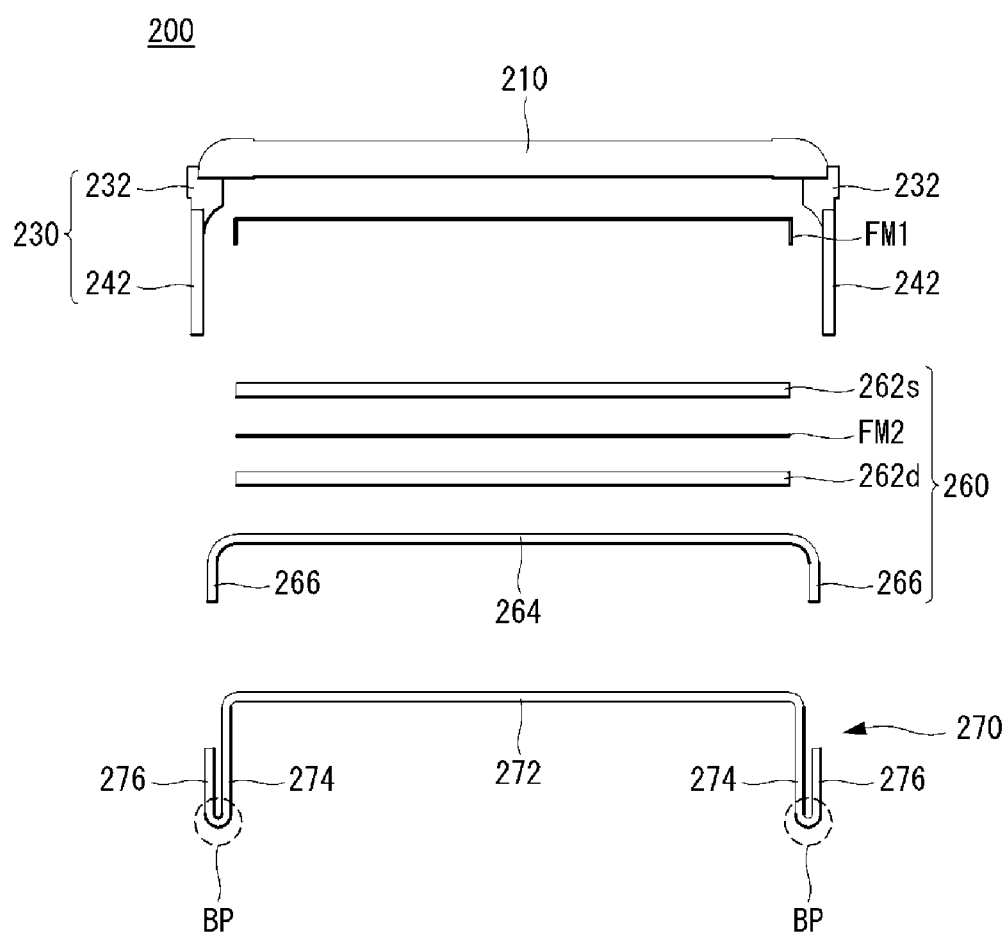

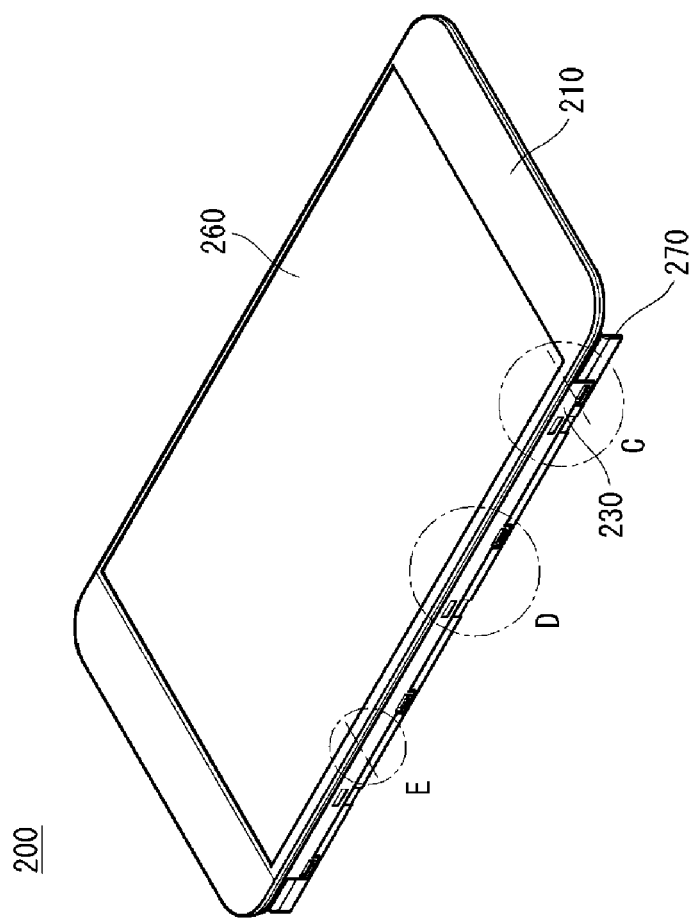

【Figure 8】
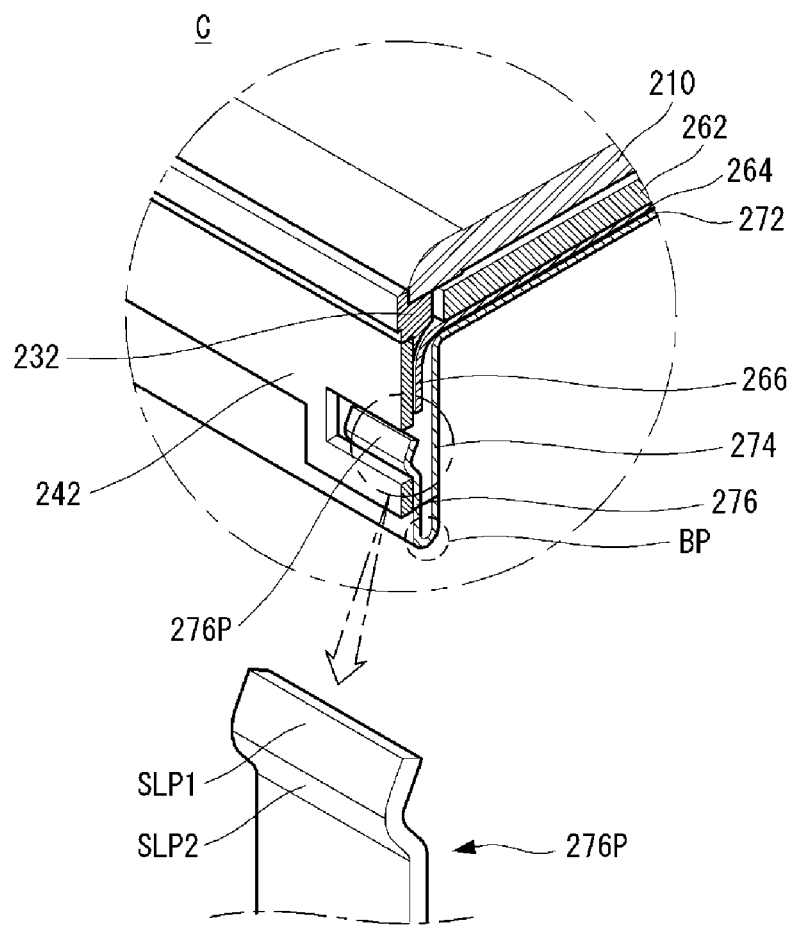

【Figure 9】
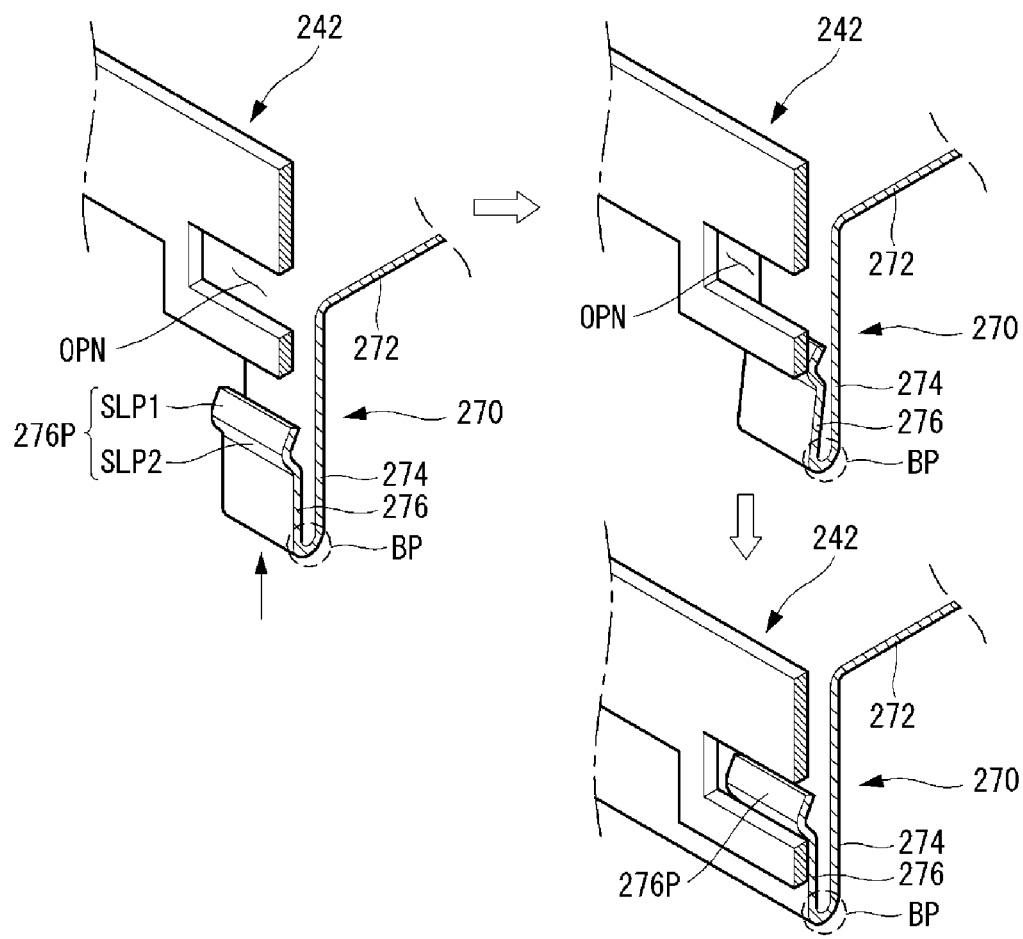

[Figure 10]
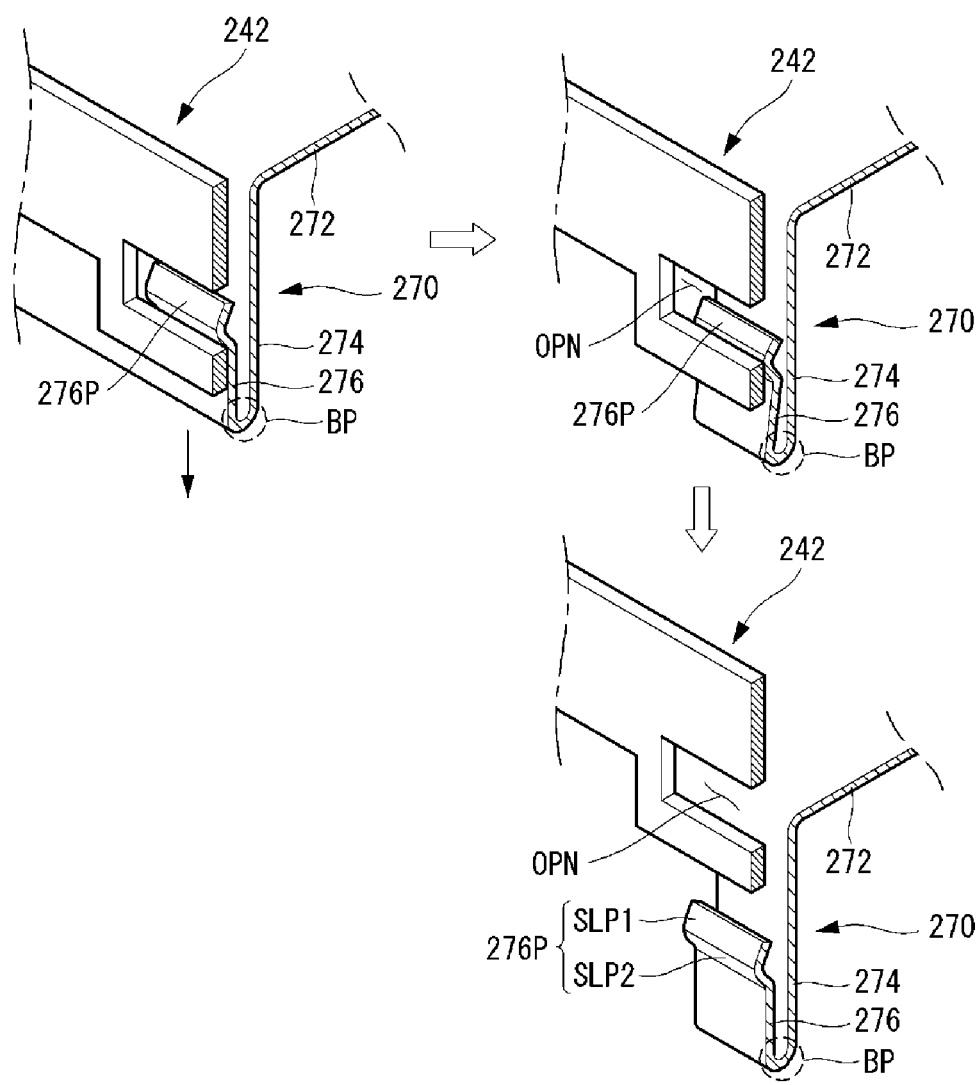

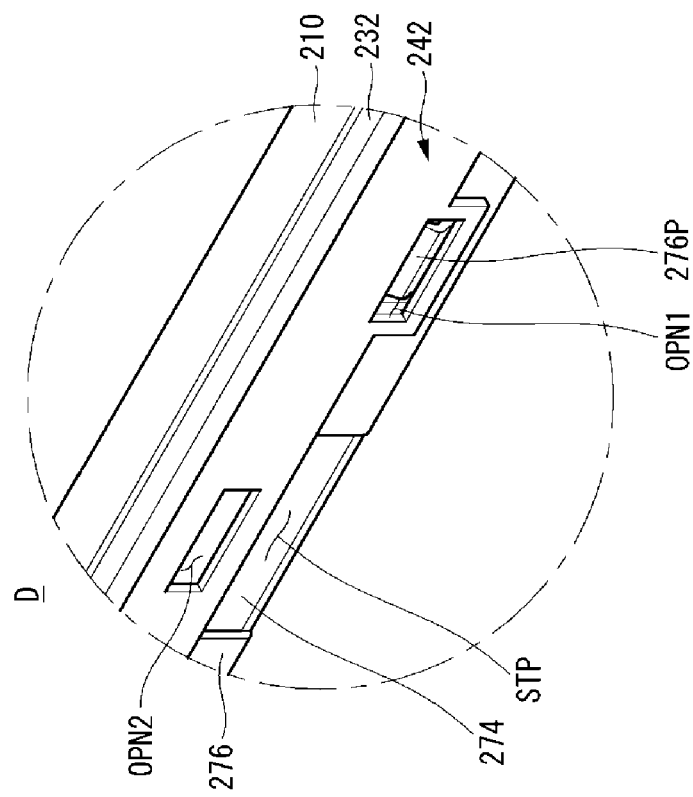
[Figure 11]

[Figure 12]
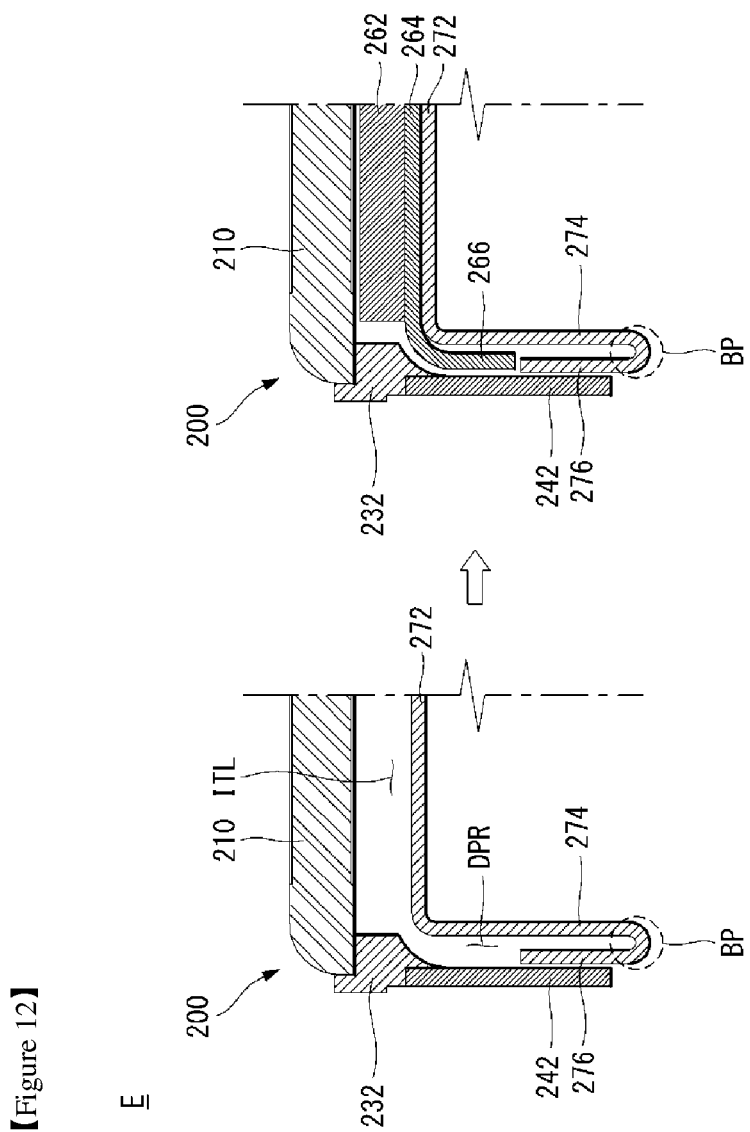

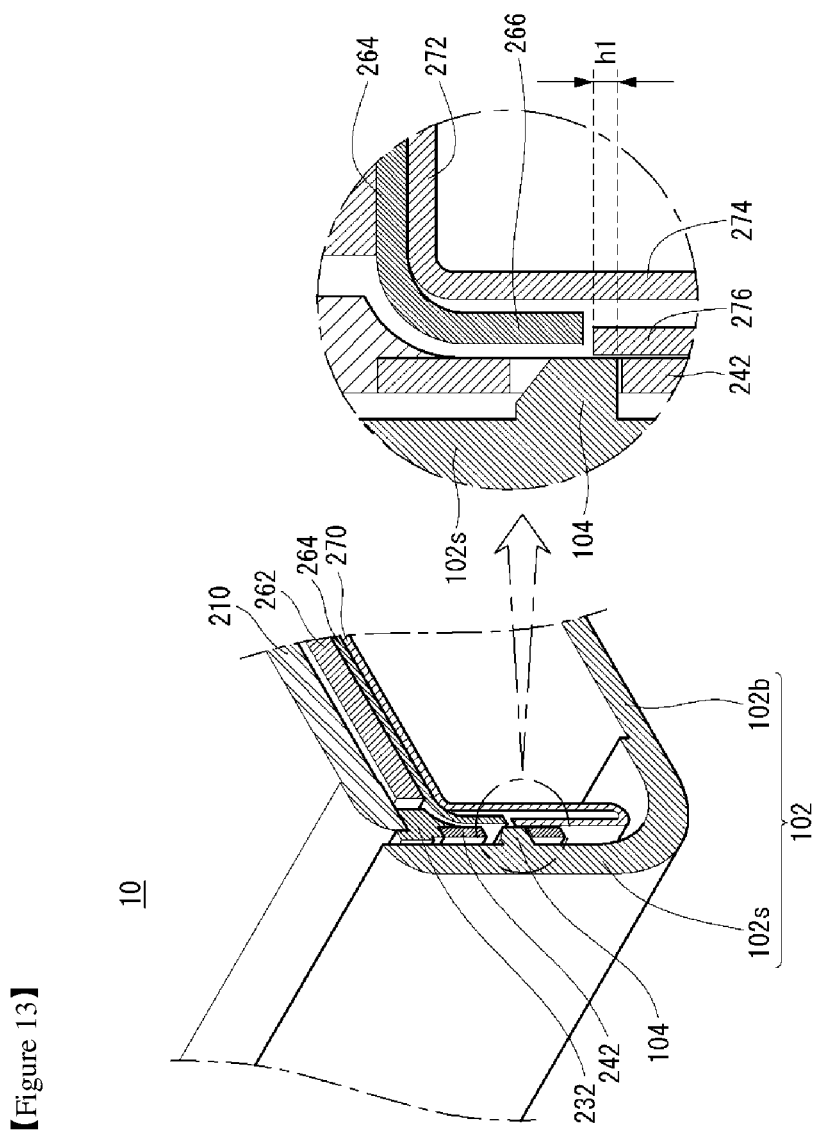
[Figure 13]

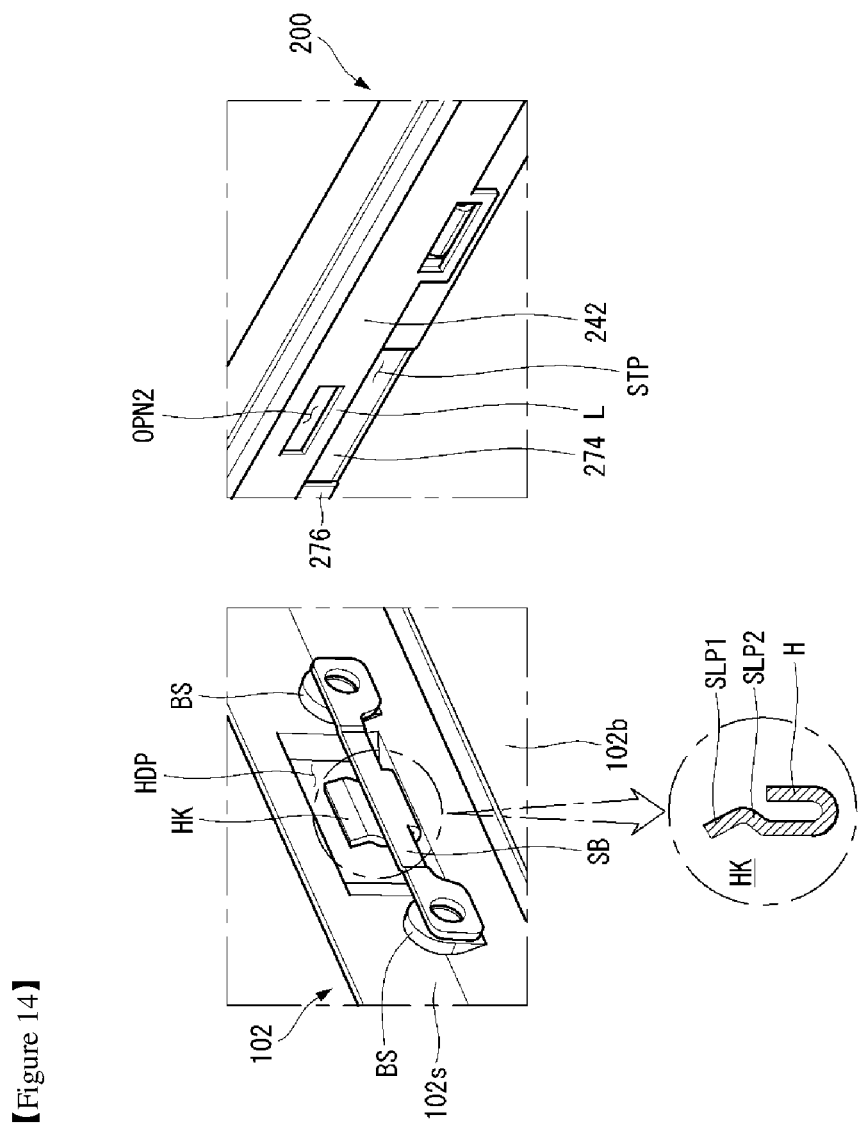
[Figure 14]

[Figure 15]
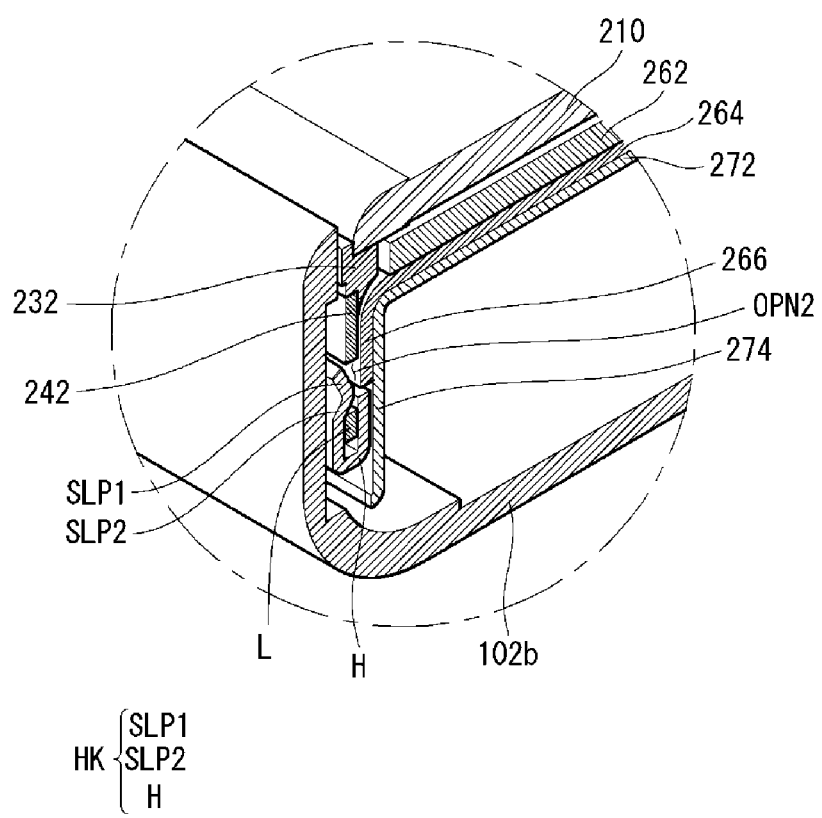

MOBILE TERMINAL

CROSS-REFERENCE TO RELATED APPLICATIONS

This application is the National Stage filing under 35 U.S.C. 371 of International Application No. PCT/KR2016/010544, filed on Sep. 21, 2016, the contents of which are all hereby incorporated by reference herein in its entirety.

TECHNICAL FIELD

The present disclosure relates to a mobile terminal. In particular, the present disclosure relates to a mobile terminal in which an end of a flexible display is positioned on a side.

BACKGROUND ART

Terminals may be generally classified into mobile/portable terminals and stationary terminals based on a mobility. The mobile/portable terminals may also be classified into handheld terminals and vehicle mounted terminals depending on whether or not a user can directly carry the terminal.

Mobile terminals have increasingly more functions. Examples of the functions include data and voice communications, taking pictures and videos with a camera, recording sound, playing music files using a speaker system, and displaying images and video on a display. Some mobile terminals include additional functionality which supports electronic game playing, while other terminals are configured as multimedia players. More recently, the mobile terminals have been configured to receive broadcast and multicast signals which permit viewing of contents such as videos and television programs.

As the mobile terminals have increasingly more functions, the mobile terminals have been implemented as multimedia players with multiple functions, such as taking pictures and video, playing music or video files, game playing, receiving broadcast, and the like.

To support and increase the functionality of the mobile terminals, improvements in structural components and/or software improvement of the mobile terminals may be considered. In particular, a technology for reducing a bezel area of the mobile terminal may be considered.

DISCLOSURE

Technical Problem

An object of the present disclosure is to address the above-described and other problems. Another object of the present disclosure is to provide a mobile terminal in which an end of a display is positioned on a side.

Technical Solution

To achieve the above-described and other objects, in one aspect of the present disclosure, there is provided a mobile terminal comprising a housing having an internal space that is opened toward a front; and a display unit coupled to the housing and positioned in front of the internal space, wherein the display unit includes a cover glass; a glass support adjacent to a side of the cover glass and disposed on a rear surface of the cover glass, wherein at least a portion of the glass support is positioned in the internal space and fixed to the cover glass; a frame including a frame body positioned in a rear of the cover glass, a first frame extension bent from the frame body to a rear of the frame body, and a second frame extension bent from the first frame extension, positioned between the first frame extension and the glass support, and coupled to the glass support; and a flexible display placed on the frame and disposed between the frame and the cover glass, wherein an edge area of the flexible display adjacent to the second frame extension is disposed between the glass support and the first frame extension.

According to another aspect of the present disclosure, the glass support may include a first opening, and the frame may include a frame protrusion that protrudes from the second frame extension toward the glass support and is fitted in the first opening.

According to another aspect of the present disclosure, the second frame extension may have an elastic force in a direction facing the first frame extension.

According to another aspect of the present disclosure, the frame protrusion may include a second inclined surface extended from the second frame extension and inclined to the first opening; and a first inclined surface extended from the second inclined surface and inclined to the first frame extension.

According to another aspect of the present disclosure, the frame may include a trench that is formed between the first frame extension and the glass support, has a depth from the cover glass to the second frame extension, and accommodates the edge area of the flexible display.

According to another aspect of the present disclosure, the glass support may include a first glass support fixed to the cover glass; and a second glass support extended from the first glass support, coupled to the frame, and made of a different material from the first glass support.

According to another aspect of the present disclosure, the first glass support may include a plastic, and the second glass support and the frame may include a metal.

According to another aspect of the present disclosure, the housing may include a bottom housing forming a bottom of the housing; and a side housing extended from the bottom housing to form a side of the housing and coupled to the display unit.

According to another aspect of the present disclosure, the glass support may include a second opening positioned in the internal space, and the side housing may include a coupling protrusion that protrudes toward the glass support and is fitted in the second opening.

According to another aspect of the present disclosure, the glass support may include a second opening positioned in the internal space, and the housing may include a hook that is positioned in the internal space and is fitted in the second opening as the hook is coupled to and separated from the side housing.

According to another aspect of the present disclosure, the glass support may include a first opening positioned in the internal space and coupled to the frame; and a second opening positioned in the internal space and coupled to the side housing.

According to another aspect of the present disclosure, the second opening may be adjacent to the cover glass as compared to the first opening.

According to another aspect of the present disclosure, the cover glass may include a flat cover glass of a plate shape; and a curved cover glass extended from the flat cover glass and bent toward the housing to have a convex shape.

According to another aspect of the present disclosure, the flexible display may include a flat display panel facing a rear surface of the flat cover glass; and a curved display panel extended from the flat display panel and facing a rear surface of the curved cover glass.

According to another aspect of the present disclosure, the glass support may be disposed between the curved cover glass and the housing.

Advantageous Effects

Effects of a mobile terminal according to the present disclosure are described as follows.

According to at least one aspect of the present disclosure, an area of a bezel formed on a front surface of a mobile terminal can decrease.

According to at least one aspect of the present disclosure, a flexible display can be easily mounted inside a mobile terminal.

According to at least one aspect of the present disclosure, a display unit can be easily mounted on a housing.

According to at least one aspect of the present disclosure, a curved display can be easily mounted inside a mobile terminal.

Further scope of applicability of the present disclosure will become apparent from the detailed description given hereinafter. However, it should be understood that the detailed description and specific examples, while indicating preferred embodiments of the disclosure, are given by illustration only, since various changes and modifications within the spirit and scope of the disclosure will become apparent to those skilled in the art from this detailed description.

DESCRIPTION OF DRAWINGS

FIGS. 1 and 2 illustrate a mobile terminal according to an embodiment of the disclosure.

FIGS. 3 and 4 illustrate examples of a cross section of a mobile terminal according to an embodiment of the disclosure.

FIGS. 5 to 12 illustrate configuration of a display unit according to an embodiment of the disclosure.

FIGS. 13 to 15 illustrate a coupling relationship between a housing and a display unit in a mobile terminal according to an embodiment of the disclosure.

MODE FOR INVENTION

Reference will now be made in detail to embodiments of the disclosure, examples of which are illustrated in the accompanying drawings. Wherever possible, the same reference numbers will be used throughout the drawings to refer to the same or like parts.

In general, a suffix such as "module" and "unit" may be used to refer to elements or components. Use of such a suffix herein is merely intended to facilitate description of the specification, and the suffix itself is not intended to give any special meaning or function. It will be noted that a detailed description of known arts will be omitted if it is determined that the detailed description of the known arts can obscure the embodiments of the disclosure. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

The terms including an ordinal number such as first, second, etc. may be used to describe various components, but the components are not limited by such terms. The terms are used only for the purpose of distinguishing one component from other components.

When an arbitrary component is described as "being connected to" or "being coupled to" another component, this should be understood to mean that still another component(s) may exist between them, although the arbitrary component may be directly connected to or directly coupled to another component. In contrast, when an arbitrary component is described as "being directly connected to" or "being directly coupled to" another component, this should be understood to mean that no component exists between them.

A singular expression can include a plural expression as long as it does not have an apparently different meaning in context.

In the present application, the terms "include" and "have" should be understood to be intended to designate that illustrated features, numbers, steps, operations, components, parts or combinations thereof are present and not to preclude the existence of one or more different features, numbers, steps, operations, components, parts or combinations thereof, or the possibility of the addition thereof.

Mobile terminals disclosed herein may be implemented using a variety of different types of devices. Examples of such devices include cellular phones, smart phones, laptop computers, digital broadcast terminals, personal digital assistants (PDAs), portable multimedia players (PMPs), navigators, slate computers (PCs), tablet PCs, ultra books, wearable devices (for example, smart watches, smart glasses, head mounted displays (HMDs)), and the like.

By way of non-limiting example only, further description will be made with reference to particular types of mobile terminals. However, such teachings may be equally applied to other types of mobile terminals, such as those types noted above. In addition, these teachings may also be applied to stationary terminals such as digital TV, desktop computers, digital signage, and the like.

With reference to FIG. 1, a front surface of a mobile terminal 10 according to an embodiment of the disclosure is shown. A first camera 121a, a first audio output unit 152a, and a display unit 200 may be observed on the front surface of the mobile terminal 10. The display unit 200 may be mounted on a housing 102.

The first camera 121a may be referred to as a front camera 121a. The first camera 121a can obtain an image or a video. The first audio output unit 152a can provide sound. The first audio output unit 152a can output call tones, alarm tones, and the like.

The display unit 200 may form the front surface of the mobile terminal 10. The display unit 200 may display an image or a video. The display unit 200 may include a touch sensor (not shown). The display unit 200 can obtain a touch input.

The display unit 200 may include a LCD or an OLED for displaying an image or a video. The organic light emitting display (OLED) may be thinner than the existing LCD and may have flexible characteristic. A mounting structure of the OLED may be considered.

The housing 102 may be positioned in the rear of the display unit 200. The housing 102 may form an internal space. The internal space of the housing 102 may be opened toward the front. The internal space of the housing 102 may be sealed by disposing the display unit 200 on a front surface of the housing 102.

The housing 102 may be formed as a unibody. That is, a side surface and a back surface of the housing 102 may be formed as one body. The housing 102 may include a metal. When the housing 102 is made of the metal, the housing 102 may be made by casting and/or pressing and/or NC machining. The metal unibody housing 102 can be advantageous in terms of waterproof and dustproof. The metal housing 102 can be advantageous in terms of strength and durability by the properties of the metal.

FIG. 2 is a cross-sectional perspective view taken along line A-A of FIG. 1.

A plurality of electronic parts may be positioned in the internal space of the housing 102. For example, the first camera 121a, the first audio output unit 152a, a battery 191, and a main circuit board 181 may be placed in the housing 102.

The main circuit board 181 may be electrically connected to the first camera 121a, the first audio output unit 152a, the battery 191, and the display unit 200. The main circuit board 181 may be supplied with power from the battery 191. The main circuit board 181 may provide an audio signal to the first audio output unit 152a and provide an image signal to the display unit 200. The main circuit board 181 may be provided with a touch input from the display unit 200.

The display unit 200 may be mounted on the front surface of the housing 102. At least a portion of the display unit 200 may be formed of a non-metal. For example, the display unit 200 may include a non-metallic LCD or OLED. When the housing 102 is formed of metal, a coupling structure of the display unit 200 and the housing 102 may be considered.

The display unit 200 may have a structure that can be easily mounted on the housing 200. Further, the display unit 200 can be easily detached from the housing 200. In this case, repairing of the mobile terminal 10 can be facilitated.

FIG. 3 is a cross-sectional view illustrating a portion B of FIG. 2. Referring to FIG. 3, the display unit 200 may be coupled to the housing 102. The housing 102 may include a metal. The housing 102 may include a bottom housing 102b and a side housing 102s. The bottom housing 102b and the side housing 102s may be formed as one body. The bottom housing 102b may form a bottom of the housing 102. The side housing 102s may form a side of the housing 102.

The housing 102 may include a coupling protrusion 104. The coupling protrusion 104 may be formed on an inner surface of the housing 102 and may have a protrusion shape. The coupling protrusion 104 may be formed in the side housing 102s. The coupling protrusion 104 may be integrally formed with the housing 102.

A portion of the display unit 200 may have a shape corresponding to the coupling protrusion 104. The display unit 200 may be coupled to the coupling protrusion 104.

A glass support 230 may be coupled to the coupling protrusion 104. The glass support 230 may include a metal. A portion of the glass support 230 may be formed of the metal and coupled to the coupling protrusion 104. The glass support 230 may fix a cover glass 210. The glass support 230 may include a first glass support 232 and a second glass support 242.

The first glass support 232 may be connected to the cover glass 210. The second glass support 242 may be connected to the housing 102. The first glass support 232 may include plastic. The second glass support 242 may include a metal. The second glass support 242 may be made of a different material from the first glass support 232. The glass support 232 may be formed by injection molding the first glass support 232 together with the second glass support 242.

The cover glass 210 may be supported by the glass support 230. The cover glass 210 may be fixed to the first glass support 232. The cover glass 210 may be transparent or translucent.

A frame 270 may be coupled to a glass support 230. The frame 270 may include a metal. The frame 270 may be formed by pressing. The frame 270 may include a frame body 272 and a first frame extension 274. The frame 270 may be indirectly connected to the housing 102. For example, the frame 270 may be indirectly connected to the housing 102 through the glass support 230. The frame 270 may shield the internal space of the housing 102. The frame 270 may form a space with the housing 102. A plurality of electronic components may be positioned in the spaced between the frame 270 and the housing 102.

The frame body 272 may be positioned in the rear of the cover glass 210. The frame body 272 may have a shape corresponding to the shape of the cover glass 210. The frame body 272 may have a plate shape.

The first frame extension 274 may be extended from an end of the frame body 272. The first frame extension 274 may be formed by bending a portion of the frame body 272. The first frame extension 274 may be formed in parallel with the second glass support 242.

An empty space may be formed between the first frame extension 274 and the second glass support 242. The empty space between the first frame extension 274 and the second glass support 242 may be referred to as a trench.

A second frame extension 276 may be formed by bending a portion of the first frame extension 274. The second frame extension 276 may be positioned between the first frame extension 274 and the second glass support 242. The second frame extension 276 may be coupled to the second glass support 242. The second frame extension 276 may extend from the first frame extension 274 and have a folded structure. The second frame extension 276 may provide rigidity to the frame 270. The second frame extension 276 may be integrally formed with the first frame extension 274. A bending portion BP may be formed between the second frame extension 276 and the first frame extension 274.

The second frame extension 276 may have elasticity. For example, the second frame extension 276 may have an elastic force in a direction parallel to a direction from the first frame extension 274 toward the second glass support 242. When the second frame extension 276 has the elastic force, the second frame extension 276 can be easily coupled to or separated from the second glass support 242.

A flexible display 260 may be placed on the frame 270. The flexible display 260 may be positioned between the frame 270 and the cover glass 210. The flexible display 260 may be attached to the cover glass 210. A portion of the flexible display 260 may be inserted into the trench. At least a portion of the flexible display 260 may be flexible. The flexible display 260 may include a display panel 262 and a display FPCB 264.

The display panel 262 may be positioned on a rear surface of the cover glass 210. The display panel 262 may be attached to the cover glass 210. The display panel 262 may be coupled to the cover glass 210 by a coupling member FM. The display panel 262 may include an LCD or an OLED. For example, the display panel 262 may include an organic light emitting display (OLED). The display panel 262 may include a touch sensor.

The display FPCB 264 may be positioned on a rear surface of the display panel 262. The display FPCB 264 may be integrally formed with the display panel 262. The display FPCB 264 may include an FPCB connected to the touch sensor. The display FPCB 264 may be placed on the frame 270. A portion 266 of the display FPCB 264 may be inserted into the trench. As an end 266 of the display FPCB 264 is inserted into the trench, the display FPCB 264 can be stably placed on the frame 270.

Referring to FIG. 4, the display unit 200 may form at least a portion of the side of the mobile terminal 10. The side of the mobile terminal 10 may be formed by the side housing 102s and the display unit 200.

The cover glass 210 may entirely have a flat shape and have a curved shape at its end. The cover glass 210 may include a flat cover glass 210f and a curved cover glass 210c. The flat cover glass 210f may be in a flat shape. The flat cover glass 210f may have a plate shape.

The curved cover glass 210c may be extended from the flat cover glass 210f. The curved cover glass 210c may have a shape bent toward the rear of the flat cover glass 210f or toward the housing 102 at an end of the flat cover glass 210f. The curved cover glass 210c may have a convex shape toward the outside.

The glass support 230 may be adjacent to an end of the cover glass 210 and fixed to the cover glass 210. The glass support 230 can support the cover glass 210. The glass support 230 may be positioned between the cover glass 210 and the housing 102. A portion of the glass support 230 may be positioned between the end of the cover glass 210 and the side housing 102s. The glass support 230 may include a first glass support 232 and a second glass support 242.

The first glass support 232 may be positioned between the curved cover glass 210c and the side housing 102s. The first glass support 232 can absorb an impact between the cover glass 210 and the housing 102. The first glass support 232 may include plastic. A portion of the first glass support 232 may be exposed to the outside.

The second glass support 242 may be extended from the first glass support 232. The second glass support 242 may be connected to one side of the first glass support 232 and positioned inside the housing 102. The second glass support 242 may be coupled to the housing 102. The second glass support 242 may be coupled to the inside of the side housing 102s. The second glass support 242 may be coupled to the inside of the side housing 102s, for example, by an adhesive. As another example, although not shown, the second glass support 242 may be physically coupled to a structure formed inside the side housing 102s. The second glass support 242 may include a metal. The second glass support 242 may be positioned between the side housing 102s and the second frame extension 276.

The frame 270 may be coupled to the second glass support 242. The second frame extension 276 may be physically coupled to the second glass support 242. The second frame extension 276 may be positioned between the second glass support 242 and the first frame extension 274. The first frame extension 274 may be extended from the second frame extension 276. The first frame extension 274 may be longer than the second frame extension 276 based on a front-rear direction. In embodiments, the front-rear direction may mean a direction connecting the bottom housing 102b from the cover glass 210. The first frame extension 274 may be extended from the frame body 272. The bending portion BP may be formed between the second frame extension 276 and the first frame extension 274.

The flexible display 260 may be placed on the frame 270. The flexible display 260 may be positioned between the frame 270 and the cover glass 210. A portion of the flexible display 260 may be inserted between the frame 270 and the glass support 230. The flexible display 260 may be attached to the rear surface of the cover glass 210. The flexible display 260 may be attached to the cover glass 210, for example, by a coupling member FM.

The display panel 262 may be attached to the cover glass 210. The display panel 262 may be positioned on the rear surface of the cover glass 210 and may have a shape corresponding to the shape of the cover glass 210. The display panel 262 may include a flat display panel 262f and a curved display panel 262c. The flat display panel 262f may be positioned on a rear surface of the flat cover glass 210f. The curved display panel 262c may be positioned on the rear surface of the curved cover glass 210c.

The curved display panel 262c may be extended from an end of the flat display panel 262f. The curved display panel 262c may be integrally formed with the flat display panel 262f. The display panel 262 may be flexible. As the display panel 262 is attached to the rear surface of the cover glass 210, the display panel 262 may have an area corresponding to an area of the cover glass 210. That is, the display panel 262 may have an area corresponding to the flat cover glass 210f and an area corresponding to the curved cover glass 210c. The flat display panel 262f may be the area corresponding to the flat cover glass 210f among the areas of the display panel 262. The curved display panel 262c may be the area corresponding to the curved cover glass 210c among the areas of the display panel 262.

The shape of the curved display panel 262c may be similar to the shape of the curved cover glass 210c. For example, the curved display panel 262c may have a shape extended from the end of the flat display panel 262f toward the bottom housing 102b. The curved display panel 262c may have a convex shape toward the outside. The curved display panel 262c may display an image or a video on the side of the mobile terminal 10.

With reference to FIG. 5, a first sub-display unit SDU1 and a second sub-display unit SDU2 are shown. The display unit 200 may be formed by coupling the first sub-display unit SDU1 and the second sub-display unit SDU2 to each other. The display unit 200 may be modularized with the first sub-display unit SDU1 and the second sub-display unit SDU2.

The first sub-display unit SDU1 may be formed by coupling the cover glass 210 and the glass support 230. The cover glass 210 may have a flat shape. The cover glass 210 may have a curved shape at an end. The cover glass 210 may have a transparent area and/or an opaque area and/or a translucent area. The glass support 230 may be coupled to one side of the cover glass 210. For example, the glass support 230 may be coupled to two parallel long sides of the cover glass 210. The glass support 230 may be fixed to the rear surface of the cover glass 210.

The glass support 230 may form a plurality of openings. Some of the openings formed in the glass support 230 may be fitted in the frame 270. Other some of the openings formed in the glass support 230 may be fitted in the housing 102 (see FIG. 3).

The second sub-display unit SDU2 may include the flexible display 260 and the frame 270. The flexible display 260 may be placed in front of the frame 270. The frame 270 may support the flexible display 260.

The first sub-display unit SDU1 and the second sub-display unit SDU2 may be coupled to each other. The glass support 232 of the first sub-display unit SDU1 and the frame 270 of the second sub-display unit SDU2 may be physically coupled. When the first sub-display unit SDU1 and the second sub-display unit SDU2 are coupled to each other, the flexible display 260 may be positioned between the cover glass 210 and the frame 270 and attached to the rear surface of the cover glass 210. When the glass support 232 and the frame 270 are coupled, a portion of the flexible display 260 may be inserted between the glass support 232 and the frame 270. As a portion of the flexible display 260 is inserted between the glass support 232 and the frame 270, the flexible display 260 can be stably placed on the frame 270.

With reference to FIG. 6, a cross section of the display unit 200 is shown as an exploded view. The display panel 262 of the flexible display 260 may have a stack structure. For example, the display panel 262 may include an upper display panel 262s and a lower display panel 262d.

The lower display panel 262d may include, for example, an OLED. The upper display panel 262s may include, for example, a touch sensor. The upper display panel 262s and the lower display panel 262d may be stacked. A second coupling member FM2 may couple the upper display panel 262s to the lower display panel 262d. The second coupling member FM2 may be made of, for example, an optical clear adhesive (OCA). The upper display panel 262s may be attached to the cover glass 210. The lower display panel 262d may be stacked on the display FPCB 264. The lower display panel 263d may be integrally formed with the display FPCB 264. The display FPCB 264 may include an FPCB connected to the upper display panel 262s.

The display unit 200 may be stacked in the front-rear direction. For example, the cover glass 210, a first coupling member FM1, the upper display panel 262s, the second coupling member FM2, the lower display panel 262d, the display FPCB 264, and the frame 272 may be sequentially stacked.

The display unit 200 may be viewed in a transverse direction. In embodiments, the transverse direction may mean a left-right direction in FIG. 6. For example, the second glass support 242, the second frame extension 276, and the first frame extension 274 may be positioned in sequence. When viewed at another height, the second glass support 252, a portion 266 of the display FPCB, and the first frame extension 274 may be positioned in sequence.

A bending portion BP may be formed between the second frame extension 276 and the first frame extension 274. The portion 266 of the display FPCB may be referred to as an edge area 266 of the flexible display 260. The edge area 266 may be positioned on the first frame extension 274.

With reference to FIG. 7, the display unit 200 is observed. The flexible display 260 may be viewed in appearance. The glass support 230 and the frame 270 may be coupled to each other. Some of openings of the glass support 230 may be fitted in the frame 270.

The glass support 230 may include an opening that is not fitted in the frame 270. Among the openings of the glass support 230, the opening of the glass support 230 which is not fitted in the frame 270 may be fitted in the housing 102 (see FIG. 3). For example, the opening of the glass support 230 which is not fitted in the frame 270 may be fitted in a protrusion protruding to the inside of the housing 102 (see FIG. 3).

FIG. 8 illustrates a portion 'C' of FIG. 7. Referring to FIG. 8, a frame protrusion 276P may be formed on the second frame extension 276. The frame protrusion 276P may be extended from the second frame extension 276. The frame protrusion 276P may have a convex shape from the second frame extension 276 toward the second glass support 242. The frame protrusion 276P may be fitted in an opening formed in the second glass support 242.

The frame protrusion 276P may have an inclined area. For example, the frame protrusion 276P may include a first inclined portion SLP1 and a second inclined portion SLP2. The first inclined portion SLP1 and the second inclined portion SLP2 may guide the frame protrusion 276P at the second glass support 242.

FIGS. 9 and 10 illustrate a coupling and a separation of a glass support and a frame.

Referring to FIG. 9, the frame protrusion 276P may approach the glass support 242 in a state where the glass support 242 and the frame 270 are separated from each other. In FIG. 9, the coupling of the glass support 242 and the frame 270 may be explained as the movement of the frame 270 based on the glass support 242. A first direction may be a direction in which the frame protrusion 276P faces the glass support 242 in a state where the glass support 242 and the frame 270 are separated from each other. The first direction may be a direction indicated by the arrow in FIG. 9. A second direction may mean the opposite direction of the first direction.

When the frame protrusion 276P further approaches the glass support 242, the first inclined portion SLP1 may contact the glass support 242 and may be pressed toward the first frame extension 274. When the first inclined portion SLP1 is pressed in a direction toward the first frame extension 274, the frame protrusion 276P may approach the first frame extension 274.

The second frame extension 276 may have elasticity with respect to the first frame extension 274. That is, the second frame extension 276 may have the properties of returning to an original position even if it is away from or close to the first frame extension 274. When the frame protrusion 276P approaches the first frame extension 274, the frame protrusion 276P formed on the second frame extension 276 may have an elastic force to return to an original position.

When the frame protrusion 276P further moves in the first direction, the frame protrusion 276P may be positioned between the glass support 242 and the first frame extension 274. When the frame protrusion 276P further moves in the first direction, the frame protrusion 276P may be fitted in an opening OPN formed in the glass support 242 by the elastic force. The frames 276 and 276P may be hook-coupled to the glass support 242.

A bending portion BP may be formed between the second frame extension 276 and the first frame extension 274. The coupling of the frame 270 and the glass support 242 around the bending portion BP may be observed. When the frame protrusion 276P approaches the glass support 242 and is subjected to the pressure, the bending portion BP may be deformed. In embodiments, a direction in which the bending portion BP is deformed may be a direction between the first frame extension 274 and the second frame extension 276. When the frame protrusion 276P further moves in the first direction, the frame protrusion 276P can be fitted in the opening OPN, and thus the bending portion BP can return to its original shape.

Referring to FIG. 10, the frame protrusion 276P may move in a second direction in a state where the glass support 242 and the frame 270 are coupled. In FIG. 10, the separation of the glass support 242 and the frame 270 may be explained as the movement of the frame 270 based on the glass support 242. The second direction may be a direction indicated by the arrow in FIG. 10.

When the frame protrusion 276P moves in the second direction in the glass support 242, the second inclined portion SLP2 may be pressed in a direction toward the first frame extension 274 by the glass support 242. When the second inclined portion SLP2 is pressed in the direction toward the first frame extension 274, the frame protrusion 276P may approach the first frame extension 274.

When the frame protrusion 276P further moves in the second direction, the frame protrusion 276P may move away from the opening OPN while approaching the first frame extension 274 and may be positioned between the glass support 242 and the first frame extension 274. When the frame protrusion 276P further moves in the second direction, the frame protrusion 276P may be separated from the glass support 242.

FIG. 11 illustrates a portion D of FIG. 7. Referring to FIG. 11, the glass support 242 may include a first opening OPN1 and a second opening OPN2. The first opening OPN1 may be a space in which the frame protrusion 270P is positioned. The first opening OPN1 may be provided in plural. The frame protrusion 270P may be provided corresponding to the number of the first openings OPN1.

The second opening OPN2 may be adjacent to the first glass support 242 or the cover glass 210 as compared to the first opening OPN1. The second opening OPN2 may be provided in plural. The second frame extension 276 may be formed adjacent to the first opening OPN1 and may not be formed in an adjacent area of the second opening OPN2. Hence, a frame stepped portion STP may be adjacent to the second opening OPN2 and may be formed in the frames 274 and 276. The frame stepped portion STP may have a thinner thickness than the adjacent area. The frame stepped portion STP may provide a space for coupling the second opening OPN2 and the housing 102 (see FIG. 3). The frame stepped portion STP may be provided in plural.

FIG. 12 illustrates a portion E of FIG. 7. Referring to FIG. 12, a state in which there is no flexible display 260 may be considered. Referring to FIG. 12, the display unit 200 in the state in which there is no flexible display 260 may be observed.

In the state in which there is no flexible display 260, a trench DPR may be formed as an empty space between the glass support 242 and the frame 274. In the state in which there is no flexible display 260, an interlayer ITL may be formed as an empty space between the cover glass 210 and the frame 272. The trench DPR may communicate with the interlayer ITL.

Referring to FIG. 12, there may be observed the display unit 200 of a state in which the flexible display 260 is positioned in the interlayer ITL and the trench DPR. The display panel 262 may be positioned in the interlayer ITL. The display FPCB 264 may be positioned in the interlayer ITL and placed on the frame body 272. An end 266 of the display FPCB may be inserted into the trench DPR. The end 266 of the display FPCB may be placed on the first frame extension 274. As the end 266 of the display FPCB 264 is inserted into the trench DPR, the display FPCB 264 can be stably placed on the frames 272 and 274.

Referring to FIG. 13, the display unit 242 may be hook-coupled to the housing 102. The coupling protrusion 104 formed in the side housing 102s may be fitted in an opening formed in the second glass support 242. The side housing 102s and the bottom housing 102b may have elasticity. In the process in which the coupling protrusion 104 is coupled to or separated from the second glass support 242, the side housing 102s may be temporarily opened with respect to the bottom housing 102b. Even if the side housing 102s is temporarily opened with respect to the bottom housing 102b, the side housing 102s can be restored to its original position by the elastic force.

The end 266 of the display FPCB may face the coupling protrusion 104. The end 266 of the display FPCB may be damaged by the coupling protrusion 104 due to an impact applied to the mobile terminal 10. The second frame extension 276 can protect the end 266 of the display FPCB.

A portion of the second frame extension 276 may overlap the coupling protrusion 104 in the transverse direction. For example, the second frame extension 276 may overlap the coupling protrusion by a distance of a height h1 in the transverse direction. The damage of the end 266 of the display FPCB resulting from the coupling protrusion 104 can be suppressed by the overlap of the second frame extension 276 and the coupling protrusion 104.

FIGS. 14 and 15 illustrate a coupling between a housing and a display unit in accordance with another embodiment of the disclosure.

Referring to FIG. 14, an opening OPN2 may be formed in the side of the display unit 200. A latch L may be formed on the side of the display unit 200. The latch L may be formed on the glass support 242. The latch L may be adjacent to the opening OPN2. The opening OPN2 may be positioned between the first glass support 232 and the latch L.

Referring to FIG. 14, a housing recess HDP may be formed on the inner surface of the side housing 102s. Bosses BS may be positioned with the housing recess HDP interposed therebetween. The bosses BS may be formed on the inner surface of the side housing 102s and may have a height. The bosses BS may include a metal. A side bar SB may connect both bosses BS. The side bar SB may include a metal. A hook HK may be connected to the side bar SB. The hook HK may be positioned between the housing recess HDP and the side bar SB. A portion of the hook HK may be accommodated in the housing recess HDP. The hook HK may include a metal.

The hook HK may include a first inclined surface SLP1 and a second inclined surface SLP2. The first inclined surface SLP1 of the hook HK may guide the hook HK to the opening OPN2 when the hook HK is coupled to the display unit 200. The second inclined surface SLP2 of the hook HK may guide the hook HK to the outside of the opening OPN2 when the hook HK is detached from the display unit 200.

The hook HK may include a holder H. The holder H may be extended from the second inclined surface SLP2. The holder H may have a shape corresponding to the latch L. When the hook HK is coupled to the display unit 200, the holder H may cover at least a portion of the latch L. The holder H may be integrally formed with the side bar SB.

The first inclined surface SLP1 and the second inclined surface SLP2 may be integrally formed with the holder H. The first inclined surface SLP1 and the second inclined surface SLP2 may have elasticity with respect to the holder H. That is, the first inclined surface SLP1 and the second inclined surface SLP2 may have a restoring force or an elastic force to return to their original position even if the first inclined surface SLP1 and the second inclined surface SLP2 are temporarily away from or close to the holder H.

The process in which the hook HK is coupled to or separated from the display unit 200 is similar to a process in which the frame 270 (see FIGS. 9 and 10) is coupled to or separated from the glass support 242 (see FIGS. 9 and 10).

With reference to FIG. 15, a state in which the display unit 200 is coupled to the housing 102 is shown. FIG. 15 illustrates that the respective components are cross-sectional for convenience of explanation. The hook HK may be fitted in the opening OPN2 formed in the second glass support 242. The opening OPN2 formed in the second glass support 242 may accommodate the first inclined surface SLP1 and the second inclined surface SLP2 of the hook HK.

Referring to FIG. 15, the holder H of the hook HK may be coupled to the latch L of the glass support 242. The holder H of the hook HK may have a shape surrounding the latch L of the glass support 242. The end 266 of the display FPCB may be spaced from the holder H.

It will be apparent to those skilled in the art that the present disclosure can be embodied in other specific forms within the scope without departing from the spirit and essential features of the present disclosure.

Some embodiments or other embodiments of the disclosure described above are not exclusive or distinct from each other. Some embodiments or other embodiments of the disclosure described above can be used together or combined in configuration or function.

The above detailed description is merely an example and is not to be considered as limiting the present disclosure. The scope of the present disclosure should be determined by rational interpretation of the appended claims, and all changes within the equivalent range of the present disclosure are included in the scope of the present disclosure.

The invention claimed is:

1. A mobile terminal comprising:
a housing having an internal space that is opened toward a front; and
a display unit coupled to the housing and positioned in front of the internal space,
wherein the display unit includes:
a cover glass;
a glass support adjacent to a side of the cover glass and disposed on a rear surface of the cover glass, wherein at least a portion of the glass support is positioned in the internal space and fixed to the cover glass;
a frame including a frame body positioned in a rear of the cover glass, a first frame extension bent from the frame body to a rear of the frame body, and a second frame extension bent from the first frame extension, positioned between the first frame extension and the glass support, and coupled to the glass support; and
a flexible display placed on the frame and disposed between the frame and the cover glass, wherein an edge area of the flexible display adjacent to the second frame extension is disposed between the glass support and the first frame extension.

2. The mobile terminal of claim 1, wherein the glass support includes a first opening,
wherein the frame includes a frame protrusion that protrudes from the second frame extension toward the glass support and is fitted in the first opening.

3. The mobile terminal of claim 2, wherein the second frame extension has an elastic force in a direction facing the first frame extension.

4. The mobile terminal of claim 3, wherein the frame protrusion includes:
a second inclined surface extended from the second frame extension and inclined to the first opening; and
a first inclined surface extended from the second inclined surface and inclined to the first frame extension.

5. The mobile terminal of claim 1, wherein the frame includes a trench that is formed between the first frame extension and the glass support, has a depth from the cover glass to the second frame extension, and accommodates the edge area of the flexible display.

6. The mobile terminal of claim 1, wherein the glass support includes:
a first glass support fixed to the cover glass; and
a second glass support extended from the first glass support, coupled to the frame, and made of a different material from the first glass support.

7. The mobile terminal of claim 6, wherein the first glass support includes a plastic,
wherein the second glass support and the frame include a metal.

8. The mobile terminal of claim 1, wherein the housing includes:
a bottom housing forming a bottom of the housing; and
a side housing extended from the bottom housing to form a side of the housing and coupled to the display unit.

9. The mobile terminal of claim 8, wherein the glass support includes a second opening positioned in the internal space,
wherein the side housing includes a coupling protrusion that protrudes toward the glass support and is fitted in the second opening.

10. The mobile terminal of claim 8, wherein the glass support includes a second opening positioned in the internal space,
wherein the housing includes a hook that is positioned in the internal space and is fitted in the second opening as the hook is coupled to and separated from the side housing.

11. The mobile terminal of claim 8, wherein the glass support includes:
a first opening positioned in the internal space and coupled to the frame; and
a second opening positioned in the internal space and coupled to the side housing.

12. The mobile terminal of claim 11, wherein the second opening is adjacent to the cover glass as compared to the first opening.

13. The mobile terminal of claim 1, wherein the cover glass includes:
a flat cover glass of a plate shape; and
a curved cover glass extended from the flat cover glass and bent toward the housing to have a convex shape.

14. The mobile terminal of claim 13, wherein the flexible display includes:
a flat display panel facing a rear surface of the flat cover glass; and
a curved display panel extended from the flat display panel and facing a rear surface of the curved cover glass.

15. The mobile terminal of claim 13, wherein the glass support is disposed between the curved cover glass and the housing.

* * * * *